(12) United States Patent
Dogan et al.

(10) Patent No.: US 7,523,483 B2
(45) Date of Patent: Apr. 21, 2009

(54) DETERMINING A POLICY PARAMETER FOR AN ENTITY OF A SUPPLY CHAIN

(75) Inventors: Koray Dogan, Boston, MA (US); Adeel Najmi, Plano, TX (US); Ramesh Raman, San Carlos, CA (US); Praveen Upadhyay, Flower Mound, TX (US)

(73) Assignee: i2 Technologies US, Inc., Dallas, TX (US)

( * ) Notice: Subject to any disclaimer, the term of this patent is extended or adjusted under 35 U.S.C. 154(b) by 1092 days.

(21) Appl. No.: 10/836,041

(22) Filed: Apr. 29, 2004

(65) Prior Publication Data

US 2004/0230829 A1 Nov. 18, 2004

Related U.S. Application Data

(60) Provisional application No. 60/470,068, filed on May 12, 2003.

(51) Int. Cl.
*G06F 21/00* (2006.01)
(52) U.S. Cl. .......................... 726/1; 713/166
(58) Field of Classification Search ............ 726/1, 726/25; 713/166
See application file for complete search history.

(56) References Cited

U.S. PATENT DOCUMENTS

| | | | | |
|---|---|---|---|---|
| 5,946,662 A | * | 8/1999 | Ettl et al. | 705/8 |
| 5,953,707 A | * | 9/1999 | Huang et al. | 705/10 |
| 5,963,919 A | * | 10/1999 | Brinkley et al. | 705/28 |
| 5,971,585 A | * | 10/1999 | Dangat et al. | 700/102 |
| 6,078,900 A | * | 6/2000 | Ettl et al. | 705/28 |
| 6,643,556 B1 | | 11/2003 | Morenz et al. | 700/106 |

FOREIGN PATENT DOCUMENTS

WO WO0109803 A1 * 2/2001

OTHER PUBLICATIONS

Smith, Stephen A., "*Optimal Inventories For An (S-1, S) System With No Backorders**" Management Science, vol. 23, No. 5, Copyright © 1977, The Institute of Mangement Sciences, pp. 522-528. Jan. 1977.
Wolff, Ronald W., "*Poisson Arrivals See Time Averages*", Operations Research, vol. 30, No. 2, © 1982 Operations Research Society of America, pp. 223-231. Mar.-Apr. 1982.

(Continued)

*Primary Examiner*—Gilberto Barron, Jr.
*Assistant Examiner*—Samson B Lemma
(74) *Attorney, Agent, or Firm*—Booth Udall, PLC; Steven J. Laureanti (57) ABSTRACT

Determining a policy parameter for an entity of a supply chain includes establishing attributes of the entities of the supply chain. Attribute segments are established for each attribute, where an attribute segment includes one or more values of the corresponding attribute. Rules are formulated using the attribute segments to define policy groups, and policy parameters are assigned to each policy group. A policy group corresponding to an entity is identified in accordance with the rules. The policy parameters assigned to the identified policy group are determined and selected for the entity.

26 Claims, 6 Drawing Sheets

OTHER PUBLICATIONS

Federgruen, Awi, et al., "*An Efficient Algorithm for Computing Optimal (s, S) Policies*", Operations Research, vol. 32, No. 6, © 1984 Operations Research Society of America, pp. 1268-1285. Nov.-Dec. 1984.

Svoronos, Antony, et al., "*Evaluation of One-For-One Replenishment Policies For Multiechelon Inventory Systems\**" Management Science, vol. 37, No. 1 Copyright © 1991, The Institute of Management Sciences, pp. 68-83. Jan. 1991.

"*Improving Service and Market Share with Inventory Optimization; How to improve both your top and bottom lines through superior inventory management*", White Paper, i2 Technologies, Inc., © Copyright 2003 i2 Technologies, Inc., 32 pages. Sep. 2003.

Johansen, Soren Glud, "*Base-stock policies for the lost sales inventory system with Poisson demand and Erlangian lead times*", Department of Operations Research, University of Aarhus, Denmark, pp. 1-14. Nov. 19, 2003.

\* cited by examiner

View Group Members

Group Statistics

| | |
|---|---|
| Total Number of Item Location Channels | 11 |
| Number of Item Location Channels in this group | 3 |
| Percentage of Item Location Channels in this group | 27% |

Select Target Group: [Default ▼] — 368

360 ↗

362

| | Item | Location | Channels | Item Volume | Item Location No. Item | Item Location Cume % No. of Customers | Item Location Hub Agreement | Channel Name | Item Cume % Volume | Item |
|---|------|----------|----------|-------------|------------------------|---------------------------------------|----------------------------|--------------|--------------------|------|
| ☐ | OVAL_TOP | ASSEMBLY_SHOP | AMERICA-DIRECT | Low | Semicustom | | Others | AMERICA | High | |
| ☐ | SHORT_NAIL | ASSEMBLY_SHOP | AMERICA-INTERNET | High | Semicustom | | Others | AMERICA | High | |
| ☐ | LEG_ANGULAR | ASSEMBLY_SHOP | ASIA-DIRECT | High | Semicustom | | Others | ASIA | High | |

366

[Move To Group] [Export To Excel] [Cancel] [Search]

*FIG. 7*

DETERMINING A POLICY PARAMETER FOR AN ENTITY OF A SUPPLY CHAIN

RELATED APPLICATION

This application claims benefit under 35 U.S.C. § 119(e) of U.S. Provisional Application No. 60/470,068, entitled "Strategic Inventory Optimization," filed May 12, 2003.

TECHNICAL FIELD

This invention relates generally to the field of supply chain analysis and more specifically to determining a policy parameter for an entity of a supply chain.

BACKGROUND

A supply chain supplies a product to a customer. Items needed to produce the product may pass through the supply chain according to policy parameters set for the items. A known technique for determining the policy parameters for items may involve segmenting the items into groups according to predefined features and then applying specific policy parameters to the groups. Known techniques for determining policy parameters, however, do not provide for effective segmentation of items. It is generally desirable to effectively segment items to determine policy parameters.

SUMMARY OF THE INVENTION

In accordance with the present invention, disadvantages and problems associated with previous supply chain analysis techniques may be reduced or eliminated.

According to one embodiment of the present invention, determining a policy parameter for an entity of a supply chain includes establishing attributes of the entities of the supply chain. Attribute segments are established for each attribute, where an attribute segment includes one or more values of the corresponding attribute. Rules are formulated using the attribute segments to define policy groups, and policy parameters are assigned to each policy group. A policy group corresponding to an entity is identified in accordance with the rules. The policy parameters assigned to the identified policy group are determined and selected for the entity.

Certain embodiments of the invention may provide one or more technical advantages. For example, attribute segments may be used to form policy groups that have associated policy parameters. Entities of a supply chain may be placed into policy groups according to the attribute segments. Policy parameters may be applied to the entities of the policy groups. Defining policy groups in such a manner may allow for effective and efficient selection of policy parameters for the entities of a supply chain. Displays may allow a user to efficiently define attributes, attribute segments, and policy groups. Logical rules may be applied to the attribute segments to effectively define the policy groups. Displays may allow a user to efficiently establish policy parameters for the policy groups.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is made to the following description, taken in conjunction with the accompanying drawings, in which.

DESCRIPTION OF EXAMPLE EMBODIMENTS

Figure 1:
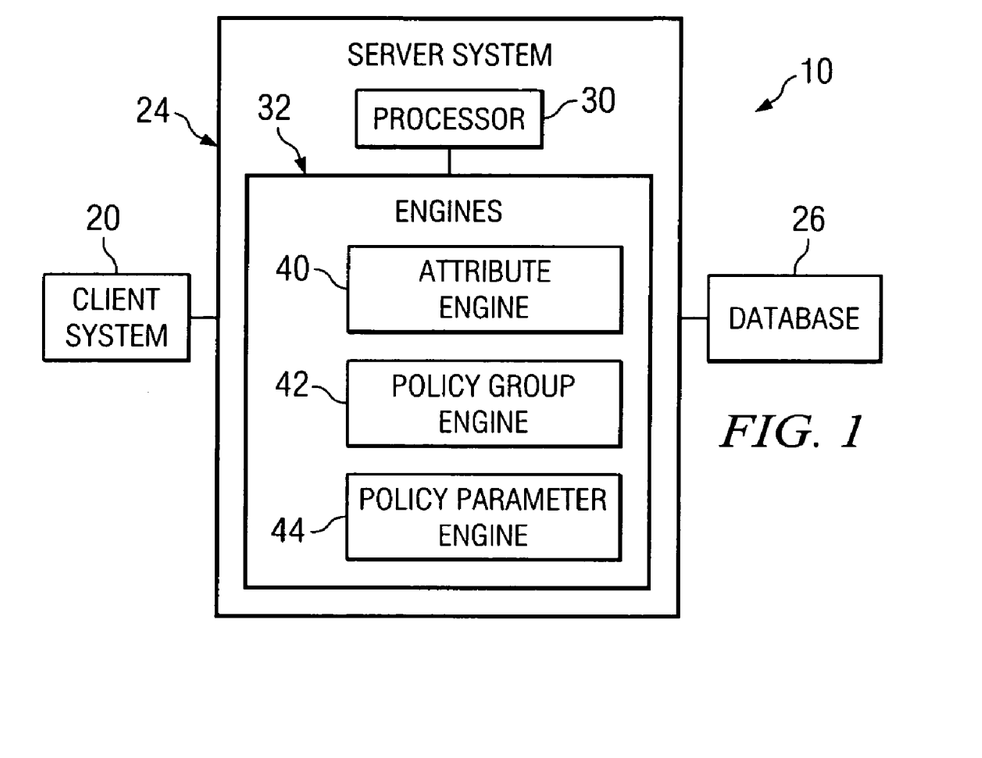
FIG. 1 is a block diagram illustrating an example system for determining policy parameters for entities of a supply chain.

FIG. 1 is a block diagram illustrating an example system 10 for determining policy parameters for entities of a supply chain. For example, system 10 may be used to establish attributes that describe entities such as the items that flow through the supply chain. Each attribute may have attribute segments that correspond to values that an attribute may have. The attribute segments may be used to define policy groups with associated policy parameters. The entities may be placed into the policy groups according to the attribute segments. The policy parameters of a policy group may be selected for the entities belonging to the policy group.

According to one embodiment, a supply chain receives supplies from one or more suppliers and provides products to one or more customers. A supply chain may include any suitable number of nodes and any suitable number of arcs between the nodes, configured in any suitable manner. The supply chain may have entities such as customers, items, locations, channels, or any other entity. Items may comprise, for example, products or parts or supplies that may be used to generate products. An item may comprise a part of the product, or an item may comprise a supply that is used to manufacture the product, but does not become a part of the product. The nodes of a supply chain may comprise, for example, locations where items are processed or where products are provided to a customer.

Different entities may have different inventory policies. For example, the different risks of stockouts for items may result in different inventory policies applied to the items. As another example, inventory locations may have to maintain different inventory levels to satisfy different contractual requirements. As yet another example, the inventory associated with a sales channel may depend on specific buying patterns and lead time expectations of customers.

A policy group comprises a set of entities strategically segmented for a particular purpose. According to one embodiment, a policy group may refer to a criticality group for which a service level policy is defined. A service level policy describes the level of service for an entity, and may include a customer service level, a lead time, or other parameter. As an example, segmentation may classify customers into criticality groups, where each criticality group has a specified customer service level. Criticality groups may be used to define different service levels for different customers. According to another embodiment, a policy group may refer to a buying behavior group that includes entities with a common buying behavior. According to another embodiment, a policy group may refer to an order lead time group that that includes entities with a common order lead time.

The entities of a supply chain may be sorted into policy groups in order to determine policy parameters for the entities. The entities may be sorted in any suitable manner. For example, the entities may be sorted by item such that each item may be placed into a different policy group. As another example, the entities may be sorted by item and location such that the same items at different locations may be placed in different policy groups. As yet another example, the entities may be sorted by item, location, and channel such that the same items at the same location but associated with different channels may be placed in different policy groups. Once the entities have been sorted into policy groups, the policy parameters of the policy groups are applied to the entities of the groups.

According to the illustrated embodiment, system 10 includes a client system 20, a server system 24, and a database 26 coupled as shown. Client system 20 allows a user to communicate with server system 24 to determine policy parameters for entities of a supply chain. Server system 24 manages applications for determining policy parameters for entities of a supply chain. Database 26 stores data that may be used by server system 24. According to the illustrated embodiment, server system 24 includes a processor 30 and one or more engines 32 coupled as shown. Processor 30 manages the operation of server system 24, and may comprise any device operable to accept input, process the input according to predefined rules, and produce an output. According to the illustrated embodiment, engines 32 includes an attribute engine 40, a policy group engine 42, and a policy parameter engine 44.

Attribute engine 40 may be used to generate attributes and corresponding attribute segments. An attribute may describe an entity of the supply chain, and may comprise any feature that may be used to distinguish entities that have different policy parameters. Examples of attributes may include, for example, a volume of an item, a hub agreement with respect to an item, or a life cycle stage of an item. An attribute segment may comprise one or more values that an attribute may have, and may be used to distinguish entities that have different policy parameters. For example, a volume attribute may have volume segments such as high volume, medium volume, and low volume.

An attribute may have attribute segments expressed in any suitable format, for example, numeric, string, or Boolean format. For example, a numeric attribute may have attribute segments expressed as numeric value ranges such as absolute value ranges. Relative attribute segments may be expressed as relative values or as percentages of the entities. As an example, for a volume attribute, a fast volume segment may be defined as 0-80% of the volume, a medium segment may be defined as 80-90% of the volume, and a slow segment may be defined as 90-100% of the volume. Attribute segments of string attributes may be expressed as a string represented by buckets. Boolean attribute segments for a Boolean attribute may be expressed as a positive value indicating that the Boolean attribute is satisfied or a negative value indicating that the Boolean attribute is not satisfied.

According to one embodiment, attribute engine 40 may, alone or in cooperation with one or more other appropriate components of system 10, generate a display that includes fields into which a user may input an attribute and corresponding attribute segments. By entering the attributes and attribute segments into the fields, a user may send a request to attribute engine 40 to generate the attributes with the corresponding attribute segments. Any suitable attribute with any suitable attribute segments may be defined using attribute engine 40. An example display for generating attributes and corresponding attribute segments is described with reference to FIG. 4.

Policy group engine 42 generates and prioritizes policy groups and assigns policy parameters to the policy groups. A policy group may be used to organize entities and to determine policy parameters for the entities. Policy groups may be generated from attribute segments of an attribute. For example, attributes may include a customer diversity attribute describing the number of customers for an item, and a volume and revenue attribute describing the volume and revenue of an item.

Policy groups may be generated by formulating rules from the attribute segments. A rule may comprise one or more attribute segments and one or more logical operators applied to the attribute segments, and may be formed by applying logical operators to the attribute segments. For example, a rule "attribute segment A and attribute segment B" may be used to define a policy group that includes entities that have attribute segments A and B. Policy groups generated from the above attribute segments may include, for example, a high customer diversity and a high volume and revenue policy group, a low customer diversity and a high volume and revenue policy group, a high customer diversity and a low volume and revenue policy group, and a low customer diversity and a low volume and revenue policy group. Any suitable rule, however, may be formulated.

Policy groups may be prioritized to resolve situations in which an entity corresponds to more than one policy group. If an entity belongs to a policy group with a higher priority and a policy group with a lower priority, the policy parameters of the policy group with the higher priority may be selected for the entity. Any other prioritized selection procedure, however, may be used to resolve these situations.

Policy group engine 42 may, alone or in cooperation with one or more other appropriate components of system 10, generate a display that includes fields in which a user may input rules and priorities. The user may enter the rules and priorities into the fields to generate a request to policy group engine 42 to generate and prioritize a policy group. An example display for generating and prioritizing policy groups is described with reference to FIG. 5.

Policy group engine 42 may assign policy parameters to the policy groups. A policy parameter may be used to define an inventory policy for a policy group. Examples of policy parameters may include, for example, a customer service level, a minimum offered lead time, or a maximum offered lead time.

Each policy group may have different strategies that may require different forecasting techniques as well as inventory management policies. Strategic segmentation into policy groups may influence not just target customer service levels and offered lead times, but can be one factor to drive different rule-based, statistical, or heuristic techniques in demand planning and demand forecasting. According to one embodiment, for high volume and stable demand, statistical time-series forecasting for best fit may be appropriate, whereas for slower moving and more volatile items, a heuristic rule-based technique may be more appropriate. For inventory management policies, for example, a high customer diversity and high volume and revenue policy group may represent items that are built-to-forecast to maximize availability and minimize lead time. A low customer diversity and high volume and revenue policy group may represent items for which a supplier collaborates with a customer to minimize uncertainty and risk. A high customer diversity and low volume and revenue policy group may represent items for which a production postponement strategy is implemented. The low customer diversity and low revenue and volume policy group may represent parts for which a build-to-order strategy is used. According to another embodiment, entities may be micro-segmented into policy groups. The policy groups may exhibit a pattern, which may be used to select an appropriate forecasting technique that may provide the best forecast.

Policy group engine 42 may, alone or in cooperation with one or more other appropriate components of system 10, generate a display that allows a user to define policy parameters for the policy groups. By entering the policy parameters into the field, a user may provide a request to policy group engine 42 to assign the policy parameters to the policy groups. The policy groups and policy parameters may be organized in a matrix. An example display for displaying a matrix describing policy parameters is described with reference to FIG. 6.

Policy parameter engine 44 determines policy parameters for the entities of a supply chain in accordance with the policy groups. According to one embodiment, policy parameter engine 44 determines one or more policy groups corresponding to an entity. An entity may correspond to a policy group if the attribute segments of the policy group describe the entity. If an entity corresponds to more than one policy group, the policy parameters of the policy group with the higher priority may be selected for the entity.

Client system 20 and server system 24 may each operate on one or more computers at one or more locations and may include appropriate input devices, output devices, mass storage media, processors, memory, or other components for receiving, processing, storing, and communicating information according to the operation of system 10. For example, the present invention contemplates the functions of both client system 20 and server system 24 being provided using a single computer system, such as a single personal computer. As used in this document, the term "computer" refers to any suitable device operable to accept input, process the input according to predefined rules, and produce output, for example, a server, workstation, personal computer, network computer, wireless telephone, personal digital assistant, one or more microprocessors within these or other devices, or any other suitable processing device. Database 26 may include any suitable data storage arrangement and may operate on one or more computers at one or more locations.

Client system 20, server system 24, and database 26 may be integrated or separated according to particular needs. Client system 20, server system 24, and database 26 may be coupled to each other using one or more computer buses, local area networks (LANs), metropolitan area networks (MANs), wide area networks (WANs), a global computer network such as the Internet, or any other appropriate wireline, optical, wireless, or other links.

In summary, an embodiment of system 10 may provide a graphical solution that allows a user to easily determine policy parameters for entities of a supply chain. System 10 provides displays that allow the user to easily define any suitable attributes, segments, or rules to generate any suitable policy groups. The policy groups may be used to easily determine a policy parameter for an entity of the supply chain.

Modifications, additions, or omissions may be made to system 10 without departing from the scope of the invention. For example, system 10 may have more, fewer, or other modules. Moreover, the operations of system 10 may be performed by more, fewer, or other modules. For example, the operations of attribute engine 40 and policy group engine 42 may be performed by one module, or the operations of policy group engine 42 may be performed by more than one module. Additionally, functions may be performed using any suitable logic comprising software, hardware, other logic, or any suitable combination of the preceding. As used in this document, "each" refers to at least one member of a set.

Figure 2:
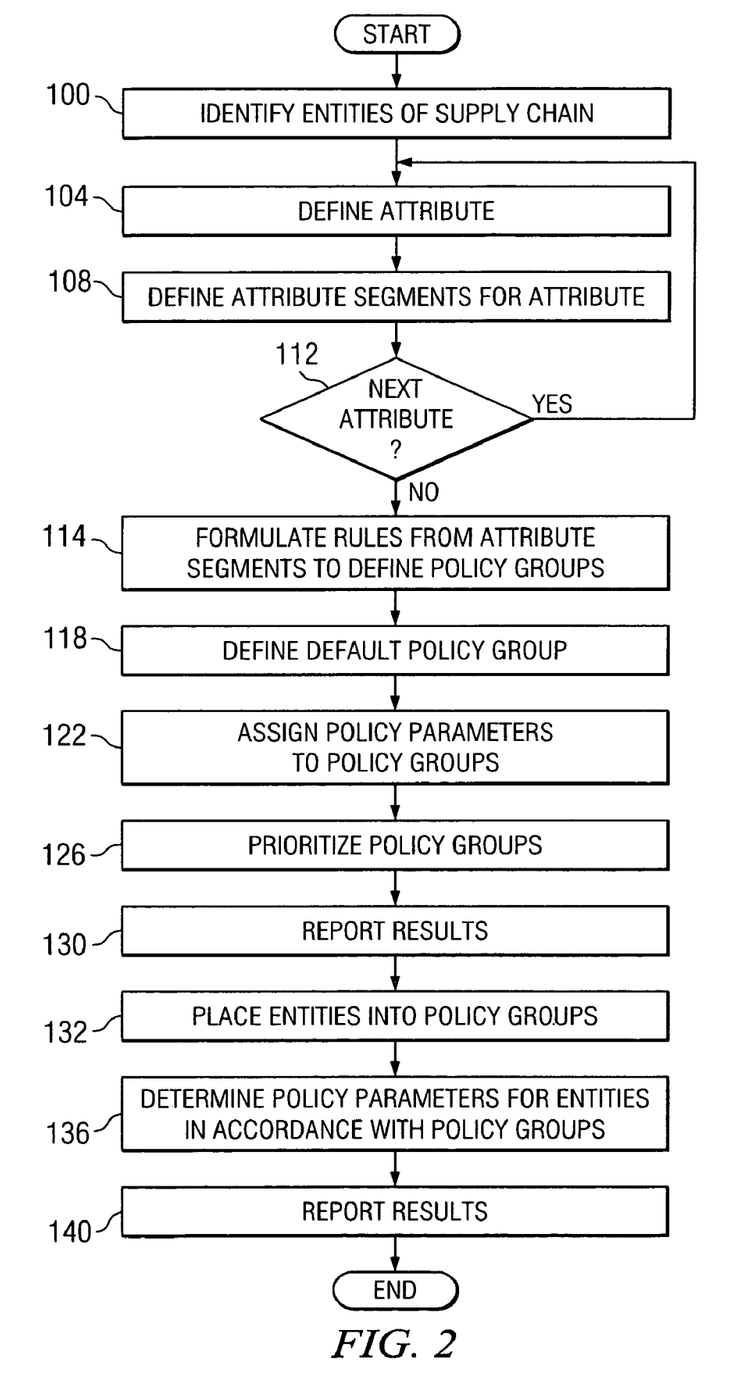
FIG. 2 is a flowchart illustrating an example method for determining policy parameters for entities of a supply chain.

FIG. 2 is a flowchart illustrating an example method for determining policy parameters for entities of a supply chain. The method begins at step 100, where the entities of a supply chain are identified. An entity may be sorted in any suitable manner, for example, by item, channel, location, or any combination of the preceding. An attribute describing the entities is defined at step 104. The attribute may comprise a feature that may be used to form policy groups for which specific policy parameters are defined. Attribute segments are defined for the attribute at step 108. An attribute segment may comprise one or more values that an attribute may have. For example, a volume attribute may have attribute segments comprising high volume, medium volume, and low volume. If there is a next attribute at step 112, the method returns to step 104 to define the next attribute. If there is no next attribute at step 112, the method proceeds to step 114.

Rules are formulated from the attribute segments in order to define policy groups at step 114. A rule may comprise one or more attribute segments and one or more logical operators applied to the attribute segments, for example, "high volume OR hub agreement." A default policy group may be defined at step 118. A default policy group refers to a policy group that corresponds to any entity that does not belong to any of the policy groups defined at step 114. The default policy group may be used to ensure that each entity belongs to at least one policy group. Policy parameters are assigned to the policy groups at step 122. Policy parameters may include, for example, a customer service level. The policy groups are prioritized at step 126. The results are reported at step 130. The entities are placed into corresponding policy groups at step 132. An entity corresponds to a policy group if the attribute segments of the policy group describe the entity. Policy parameters are determined for the entities in accordance with the policy groups at step 136. The policy parameters for a policy group may be selected for the entities corresponding to the policy group. Results are reported at step 140. After reporting the results, the method ends.

Modifications, additions, or omissions may be made to the method without departing from the scope of the invention. For example, the step of defining a default policy group may be omitted. Additionally, steps may be performed in any suitable order without departing from the scope of the invention.

Figure 3:
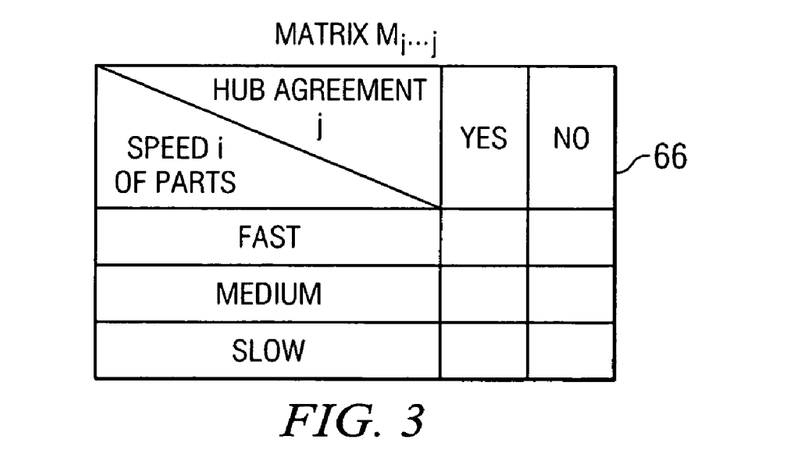
FIG. 3 illustrates an example matrix that may be used to organize policy groups.

FIG. 3 illustrates an example matrix $M_{i...j}$ 66 that may be used to organize policy groups. Matrix $M_{i...j}$ 66 is used to segment products into policy groups, where each entry, or cell, $m_{i...j}$ represents a policy group with specific policy parameters. Matrix $M_{i...j}$ 66 may have any suitable number of indices i . . . j, where each index represents an attribute of the entities. According to the illustrated example, index i represents the relative speed with which items for the product move through the supply chain, and j represents whether there is a hub agreement with the nodes through which the items flow. An index may, however, represent any suitable attribute. Moreover, matrix $M_{i...j}$ may have any suitable number of indices for any suitable number of dimensions.

As used herein, the term "matrix" is meant to encompass any suitable arrangement of attributes in which each attribute associated with the matrix corresponds to at least one index of the matrix and may correspond to any number of indices of the matrix. Such a matrix may have any suitable format. As an example, different cells may each have different indices or a different number of indices. As another example, policy groups corresponding to the cells may overlap. That is, a cell may be associated with more than one policy group. Membership to overlapping policy groups may be resolved by, for example, assigning priorities to the groups such that membership to a higher priority policy group takes precedence over a lower priority policy group. As another example, a cell may be assigned to represent a default policy group if it has not been assigned to represent another policy group such that each cell represents a policy group. As another example, an attribute not corresponding to any index of the matrix may be assigned to a default policy group.

Figure 4:
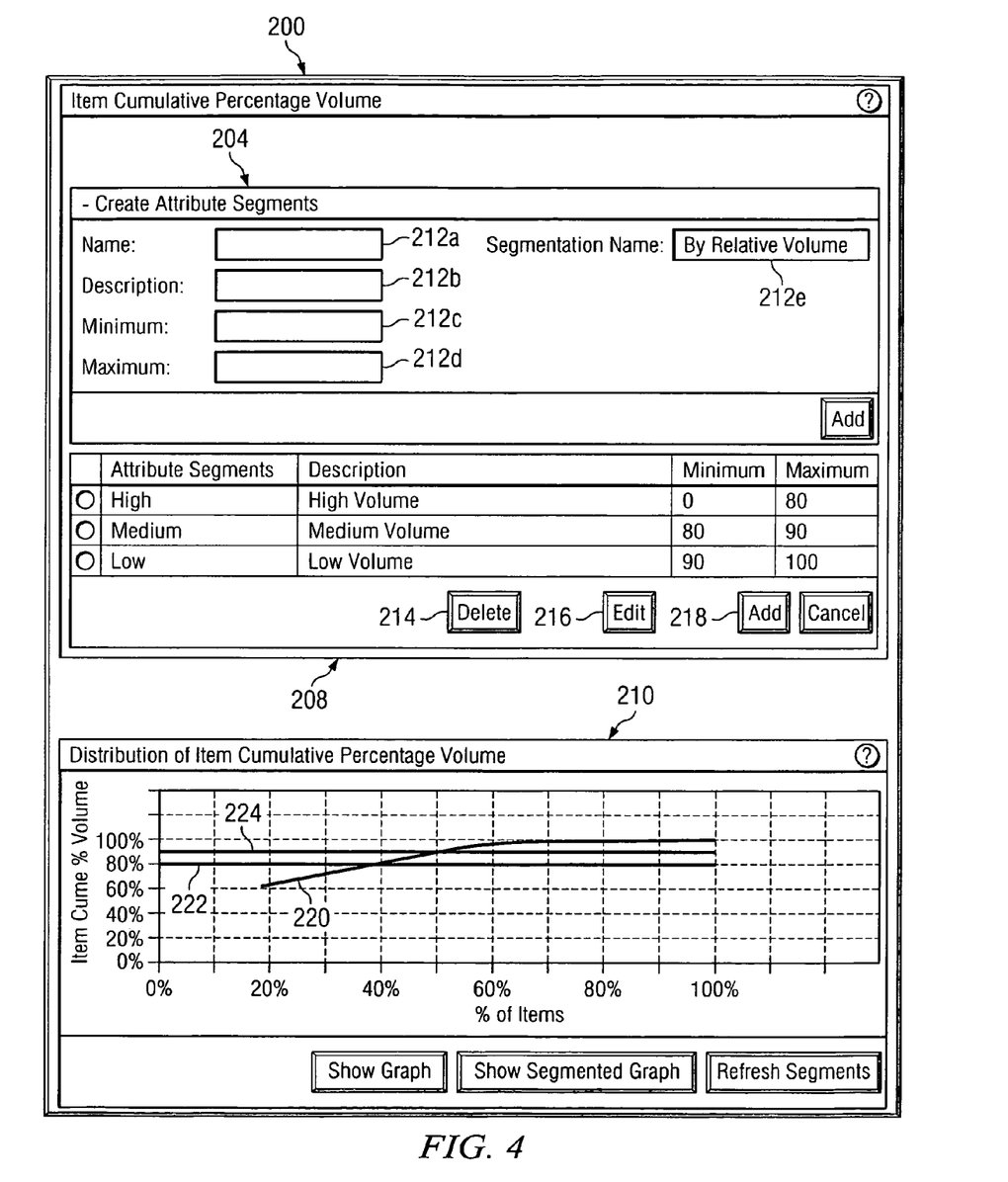
FIG. 4 illustrates an example display for creating attribute segments.

FIG. 4 illustrates an example display 200 for creating attribute segments. According to the illustrated example, display 200 may be used to create attribute segments for an item cumulative percentage volume attribute. Display 200, however, may be used to create attribute segments for any suitable attribute. According to one embodiment, display 200 includes a create attribute segment section 204, an attribute segment section 208, and a graphical section 210. Display 200, however, may include any suitable sections displayed in any suitable manner.

Create attribute segment section 204 may be used to generate attribute segments defined by a user. A user may enter information into fields 212. Name field 212a and description field 212b may be used to enter the name and description of an attribute segment, respectively. Minimum field 212c and maximum field 212d may be used to enter a minimum and maximum value for the attribute segment, respectfully. Segmentation name field 212e may be used to enter a description of the feature that is used to create the attribute segments.

Attribute segment section 208 displays attribute segments for the example item cumulative percentage volume attribute. According to the illustrated example, attribute segments comprise a high attribute segment, a medium attribute segment, and a low attribute segment. For example, the high attribute segment may describe high volume items with an item cumulative percentage volume between 0% and 80%, the medium attribute segment may describe medium volume items with an item cumulative percentage volume between 80% and 90%, and the low attribute segment may describe low volume items with an item cumulative percent volume between 90% and 100%. According to one embodiment, if one or more entities is not a member of any of the attribute segments, a default attribute segment may be defined to contain such entities. Delete button 214, edit button 216, and add button 218 may be used to delete, edit, and add attribute segments, respectively.

Graphical section 210 may be used to graphically show the attribute segments or related information. In the illustrated embodiment, a curve 220 represents the item cumulative percentage volume versus the percentage of volume. A line 222 indicates the division between low volume items and medium volume items. A line 224 indicates the division between medium volume items and high volume items.

Display 200 may be used to create attributes segments for any suitable attribute. For example, an absolute number of customers attribute may be defined to describe the absolute number of customers for an item-location. Attribute segments such as a custom, a semi-custom, and a commodity attribute segment may be created for the attribute. The custom attribute segment may be used represent item-locations with only one customer. A semi-custom attribute segment may be used to describe item-locations with two or three customers. A commodity attribute segment may be used to describe item-locations with more than three customers.

As another example, a margin attribute may describe the margin of specific items. Attribute segments such as a low margin attribute segment, a medium margin attribute segment, and a high margin attribute segment may be created for the attribute. A low margin attribute segment may represent items with a margin between 0 and 5,000,000. A medium margin attribute segment may describe items with a margin between 5,000,000 and 20,000,000. A high margin attribute segment may represent items with a margin greater than 20,000,000.

As another example, a hub agreement attribute may describe whether an item-location has a hub agreement. Attribute segments such as a hub agreement attribute segment and a default attribute segment may be created for the attribute. The hub agreement attribute segment may describe item-locations with hub agreements, and the default attribute segment may describe item locations that do not have hub agreements.

As yet another example, an item life cycle stage attribute may describe where within a life cycle an item is located. Attribute segments such as a mature attribute segment, an early attribute segment, and an end-of-life attribute segment may be generated for the attribute. A mature attribute segment represents items that have a cycle stage of "mature." An early attribute segment represents items that have a cycle stage of "concept," or "prototype." An end-of-life attribute segment describes items that have a cycle stage of "end of life."

Modifications, additions, or omissions may be made to display 200 without departing from the scope of the invention. For example, display 200 may have more, fewer, or other graphical elements. Moreover, the operations of display 200 may be performed by more, fewer, or other graphical elements arranged in any suitable manner.

Figure 5:
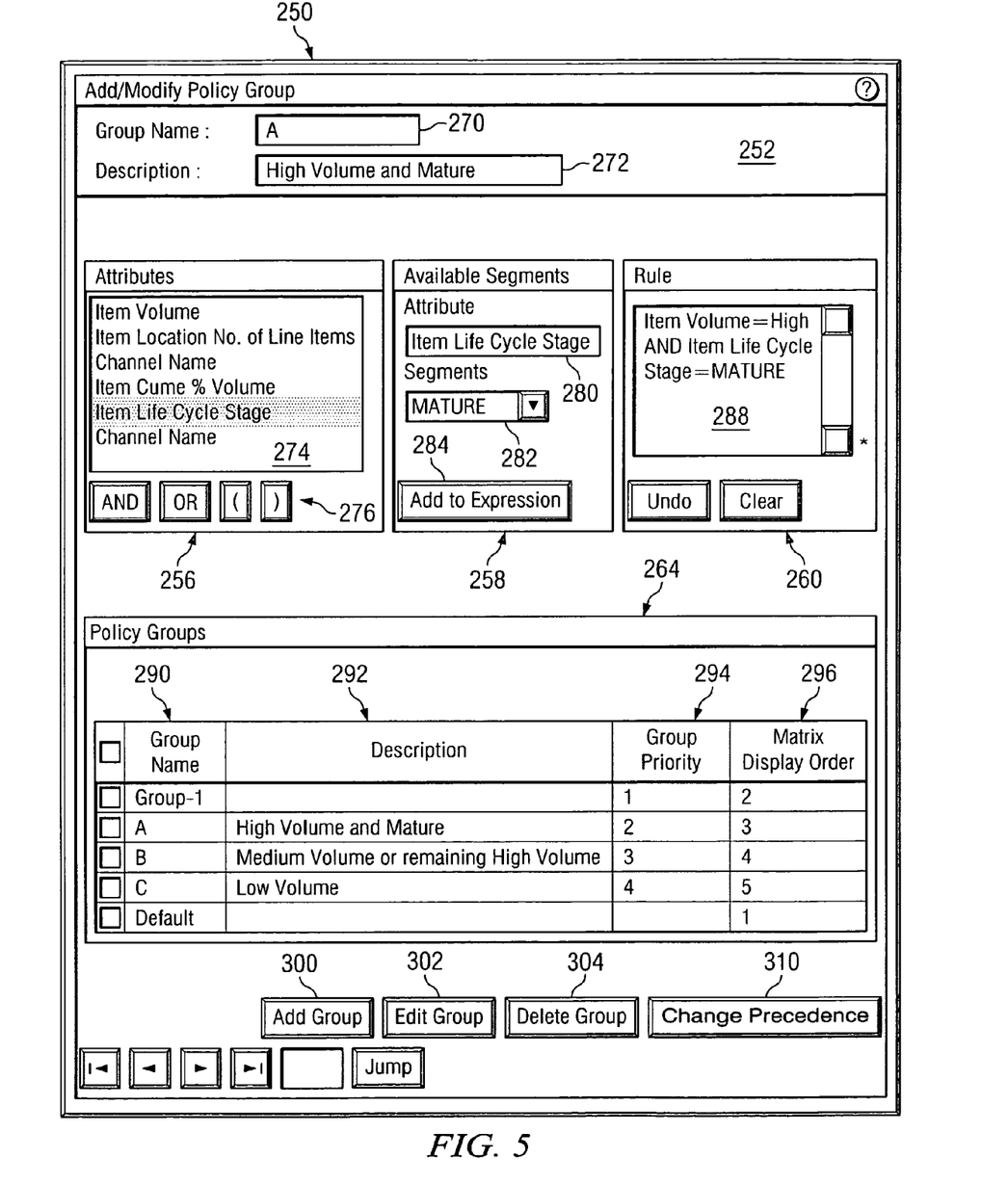
FIG. 5 illustrates an example display for generating a policy group from segment attributes.

FIG. 5 illustrates an example display 250 for generating a policy group, for example, a criticality group from segment attributes. According to one embodiment, display 250 includes an add/modify policy group section 252, an attributes section 256, an available segments section 258, a rule section 260, and a policy groups section 264. Display 250 may, however, include fewer, more, or other sections.

According to the illustrated embodiment, add/modify policy group section 252 includes a group name field 270 and a description field 272 into which the group name and description, respectively, may be entered. Attribute section 256 allows a user to select an attribute, and available segments section 258 allows the user to select segments corresponding to the selected attribute in order to formulate a rule that may be used to define a policy group. Attribute section 256 includes a segment attributes menu 274 and logical operation selectors 276. Segment attributes menu 274 displays attributes from which a user may select. Logic operators selectors 276 may include any suitable graphical entity that may be used to select a logical operator. According to the illustrated embodiment, logic operation selectors 276 includes buttons that a user may activate in order to select an AND operator, an OR operator, or parentheses.

Available segments section 258 includes an attribute display 280, a segments menu 282, and a segment selector 284. Attribute display 280 displays the name of the attribute selected using attributes section 256. Segments menu 282 displays the segments corresponding to the selected attribute. The user may select an attribute segment using segment selector 284. Rule section 260 displays the rule that is being constructed.

Policy group section 264 displays the policy groups. Policy groups section 264 may include a group names section 290, a description section 292, a group priority section 294, and a matrix display order section 296. Group name section 290 and description section 292 may be used to display the group name and description, respectively, of the policy group.

Group priority section 294 displays the priority of the policy groups. Matrix display order section 296 describes the order in which the policy groups are displayed in a matrix. An add group selector 300, and edit group selector 302, and a delete group selector 304 may be used to add, edit, or delete, respectively, policy groups. A change precedence button may be used to change the priority of the policy groups.

Modifications, additions, or omissions may be made to display 250 without departing from the scope of the invention. For example, display 250 may have more, fewer, or other graphical elements. Moreover, the operations of display 250 may be performed by more, fewer, or other graphical elements arranged in any suitable manner.

Figure 6:
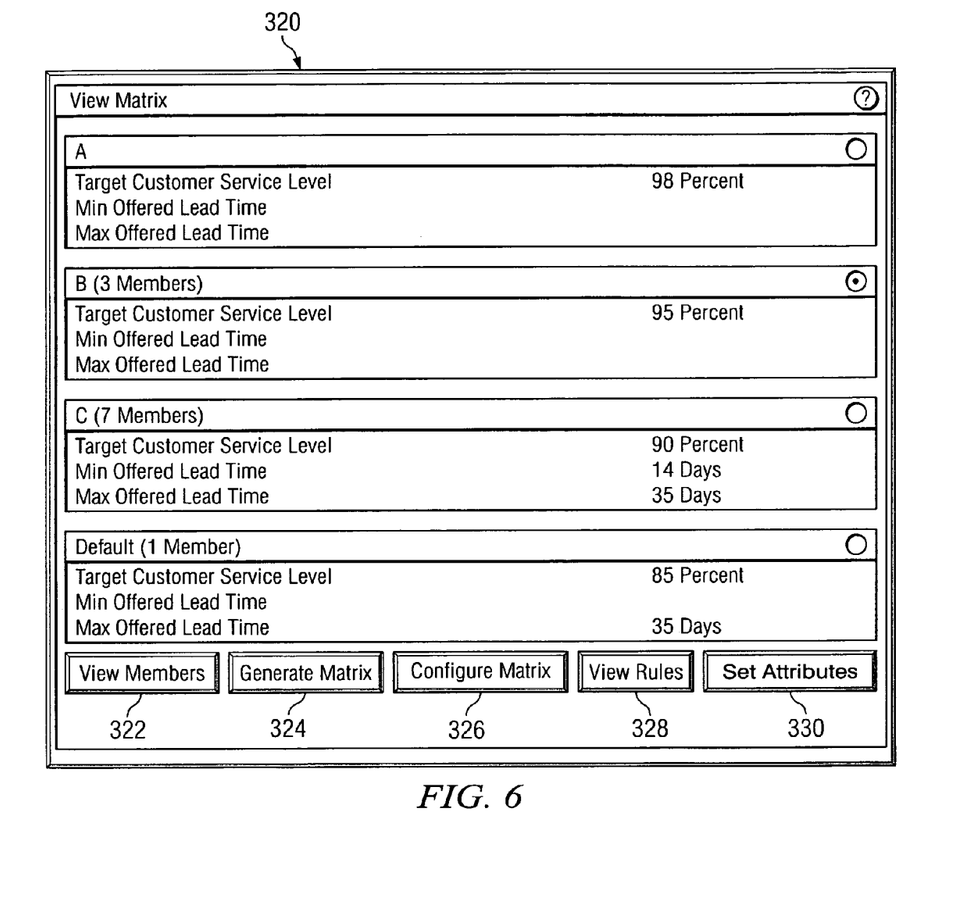
FIG. 6 illustrates an example display for displaying policy parameters for policy groups.

FIG. 6 illustrates an example display 320 for displaying policy parameters for policy groups such as criticality groups. The example policy matrix displays policy parameters for groups A, B, and C and a default group. Group A represents high volume and mature items, group B represents medium volume items, group C represents low volume items, and the default group represents any remaining items. Policy parameters include, for example, a target customer service level, a minimum offered lead time, and a maximum offered lead time. The minimum offered lead time may attempt to position inventory so that orders are promised with at least the minimum lead time but not with a shorter lead time. The maximum offered lead time may attempt to position inventory so that no orders are promised with a lead time longer than the maximum lead time. A group may be selected in order to display more detailed information about the group. In the illustrated embodiment, group B is selected.

Display 320 may include selectors such as a view members selector 322, a generate matrix selector 324, a configure matrix selector 326, a view rules selector 328, and a set attributes selector 330. View members selector 322 may be used to display the members of the policy groups shown in display 320. Generate matrix selector 324 may be used to generate a policy matrix. Configure matrix selector 326 may be used to select and organize the information presented in the matrix. View rules selector 328 may be used to view the rules used to define the policy groups. Set attributes selector 330 may be used to display a display that may be used to define attributes and corresponding attribute segments.

Modifications, additions, or omissions may be made to display 320 without departing from the scope of the invention. For example, display 320 may have more, fewer, or other graphical elements. Moreover, the operations of display 320 may be performed by more, fewer, or other graphical elements arranged in any suitable manner.

Figure 7:
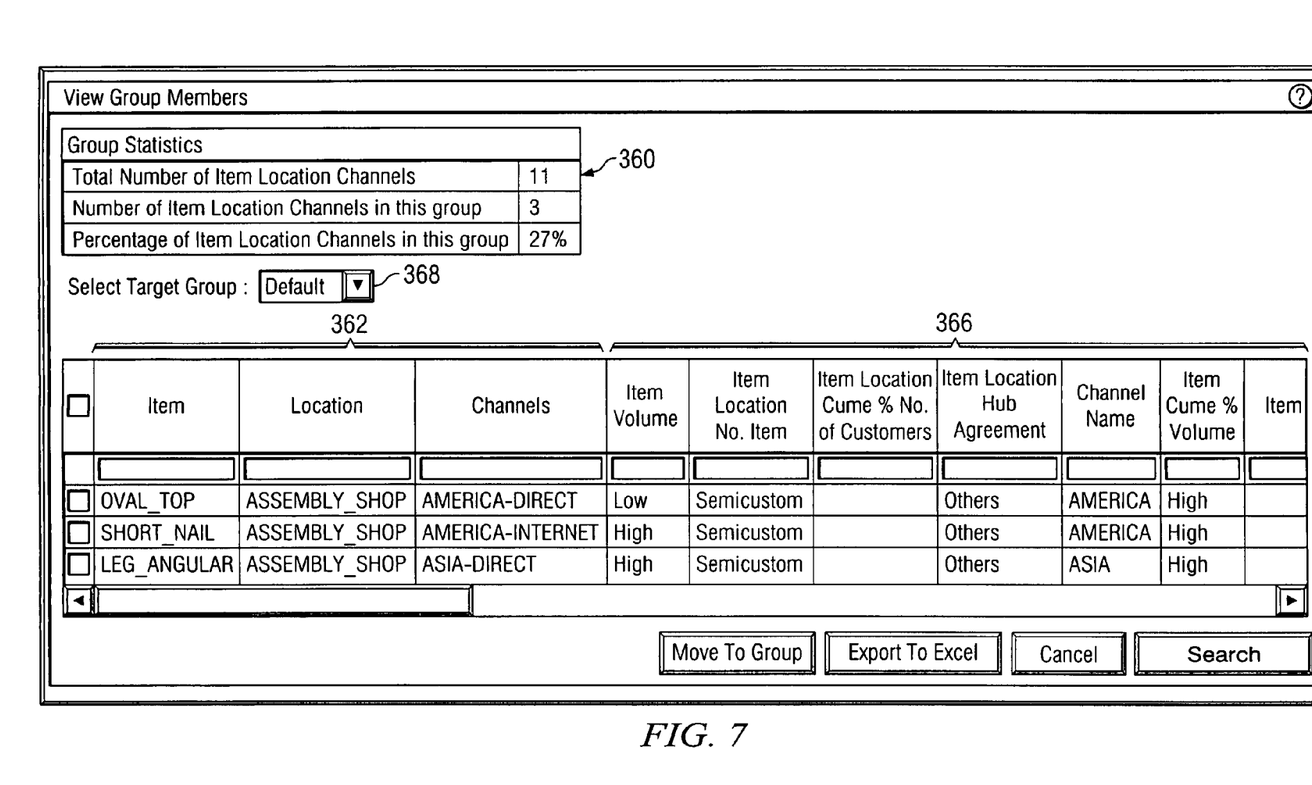
FIG. 7 illustrates an example display for viewing more detailed information about a policy group.

FIG. 7 illustrates an example display 350 for viewing more detailed information about a policy group such as a criticality group. According to the illustrated embodiment, detailed information is provided about group B. Display 350 may include a group statistics section 360, an item-location-channel listing 362, an attribute segment listing 366, and a target group selector 368. Group statistics section 360 may present statistics related to the group. According to the illustrated embodiment, group statistics section 360 describes the total number of item-location-channels, the number of item-location-channels in this group, and the percentage of item-location-channels in the selected group. Item-location-channel listing 362 displays the lists of item-location-channels. Segment attribute section 366 lists the attribute segments of the item-location-channels listed in 362. Target group selected 368 may be used to select a group to which the displayed group may be merged.

Modifications, additions, or omissions may be made to display 350 without departing from the scope of the invention. For example, display 350 may have more, fewer, or other graphical elements. Moreover, the operations of display 350 may be performed by more, fewer, or other graphical elements arranged in any suitable manner.

Certain embodiments of the invention may provide one or more technical advantages. For example, attribute segments may be used to form policy groups that have associated policy parameters. Entities of a supply chain may be placed into policy groups according to the attribute segments. Policy parameters may be applied to the entities of the policy groups. Defining policy groups in such a manner may allow for effective and efficient selection of policy parameters for the entities of a supply chain. Displays may allow a user to efficiently define attributes, attribute segments, and policy groups. Logical rules may be applied to the attribute segments to effectively define the policy groups. Displays may allow a user to efficiently establish policy parameters for the policy groups.

Although an embodiment of the invention and its advantages are described in detail, a person skilled in the art could make various alterations, additions, and omissions without departing from the spirit and scope of the present invention as defined by the appended claims.

What is claimed is:

1. A method for determining a policy parameter for an entity of a supply chain, comprising:
   establishing one or more attributes of a plurality of entities of a supply chain;
   establishing a plurality of attribute segments for each attribute, each attribute segment comprising one or more values of the corresponding attribute;
   formulating one or more rules using one or more of the attribute segments to define one or more policy groups;
   assigning one or more policy parameters of a plurality of policy parameters to each policy group;
   identifying a policy group corresponding to an entity of the plurality of entities in accordance with the one or more rules;
   determining the one or more policy parameters assigned to the identified policy group; and
   selecting the one or more policy parameters for the entity.

2. The method of claim 1, wherein the entity comprises one of an item, a location, a channel, or any combination of the preceding.

3. The method of claim 1, wherein establishing the one or more attributes comprises:
   receiving from a user a request to generate an attribute; and
   establishing the attribute in response to the request to generate the attribute.

4. The method of claim 1, wherein establishing the plurality of attribute segments comprises:
   receiving from a user a request to generate an attribute segment for an attribute; and
   establishing the attribute segment in response to the request to generate the attribute segment.

5. The method of claim 1, further comprising:
   assigning a priority to each policy group, a first policy group having a higher priority, a second policy group having a lower priority;
   determining that the entity corresponds to the first policy group and to the second policy group; and
   selecting the one or more policy parameters of the first policy group for the entity.

6. The method of claim 1, wherein the one or more policy groups comprises a default policy group, each entity of the plurality of entities corresponding to a least one policy group.

7. The method of claim 1, wherein the one or more policy groups comprise one or more criticality groups.

8. The method of claim 1, wherein the one or more policy groups comprise one or more order lead time groups.

9. A system for determining a policy parameter for an entity of a supply chain, comprising:
a database operable to store information about a supply chain; and
a computer system coupled to the database and operable to:
establish one or more attributes of a plurality of entities of the supply chain;
establish a plurality of attribute segments for each attribute, each attribute segment comprising one or more values of the corresponding attribute;
formulate one or more rules using one or more of the attribute segments to define one or more policy groups;
assign one or more policy parameters of a plurality of policy parameters to each policy group;
identify a policy group corresponding to an entity of the plurality of entities in accordance with the one or more rules;
determine the one or more policy parameters assigned to the identified policy group; and
select the one or more policy parameters for the entity.

10. The system of claim 9, wherein the entity comprises one of an item, a location, a channel, or any combination of the preceding.

11. The system of claim 9, the computer system operable to establish the one or more attributes by:
receiving from a user a request to generate an attribute; and
establishing the attribute in response to the request to generate the attribute.

12. The system of claim 9, the computer system operable to establish the plurality of attribute segments by:
receiving from a user a request to generate an attribute segment for an attribute; and
establishing the attribute segment in response to the request to generate the attribute segment.

13. The system of claim 9, wherein the computer system is further operable to:
assign a priority to each policy group, a first policy group having a higher priority, a second policy group having a lower priority;
determine that the entity corresponds to the first policy group and to the second policy group; and
select the one or more policy parameters of the first policy group for the entity.

14. The system of claim 9, wherein the one or more policy groups comprises a default policy group, each entity of the plurality of entities corresponding to at least one policy group.

15. The system of claim 9, wherein the one or more policy groups comprise one or more criticality groups.

16. The system of claim 9, wherein the one or more policy groups comprise one or more order lead time groups.

17. Software for determining a policy parameter for an entity of a supply chain, the software embodied in a computer readable storage medium and when executed by a computer operable to:
establish one or more attributes of a plurality of entities of a supply chain;
establish a plurality of attribute segments for each attribute, each attribute segment comprising one or more values of the corresponding attribute;
formulate one or more rules using one or more of the attribute segments to define one or more policy groups;
assign one or more policy parameters of a plurality of policy parameters to each policy group;
identify a policy group corresponding to an entity of the plurality of entities in accordance with the one or more rules;
determine the one or more policy parameters assigned to the identified policy group; and select the one or more policy parameters for the entity.

18. The software of claim 17, wherein the entity comprises one of an item, a location, a channel, or any combination of the preceding.

19. The software of claim 17, operable to establish the one or more attributes by:
receiving from a user a request to generate an attribute; and
establishing the attribute in response to the request to generate the attribute.

20. The software of claim 17, operable to establish the plurality of attribute segments by:
receiving from a user a request to generate an attribute segment for an attribute; and
establishing the attribute segment in response to the request to generate the attribute segment.

21. The software of claim 17, further operable to:
assign a priority to each policy group, a first policy group having a higher priority, a second policy group having a lower priority;
determine that the entity corresponds to the first policy group and to the second policy group; and
select the one or more policy parameters of the first policy group for the entity.

22. The software of claim 17, wherein the one or more policy groups comprises a default policy group, each entity of the plurality of entities corresponding to at least one policy group.

23. The software of claim 17, wherein the one or more policy groups comprise one or more criticality groups.

24. The software of claim 17, wherein the one or more policy groups comprise one or more order lead time groups.

25. A system for determining a policy parameter for an entity of a supply chain, comprising:
means for establishing one or more attributes of a plurality of entities of a supply chain;
means for establishing a plurality of attribute segments for each attribute, each attribute segment comprising one or more values of the corresponding attribute;
means for formulating one or more rules using one or more of the attribute segments to define one or more policy groups;
means for assigning one or more policy parameters of a plurality of policy parameters to each policy group;
means for identifying a policy group corresponding to an entity of the plurality of entities in accordance with the one or more rules;
means for determining the one or more policy parameters assigned to the identified policy group; and
means for selecting the one or more policy parameters for the entity.

26. A method for determining a policy parameter for an entity of a supply chain, comprising:
establishing one or more attributes of a plurality of entities of a supply chain by:
receiving from a user a request to generate an attribute; and
establishing the attribute in response to the request to generate the attribute;
establishing a plurality of attribute segments for each attribute, each attribute segment comprising one or more values of the corresponding attribute, the attribute segments established by:

receiving from the user a request to generate an attribute segment for an attribute; and establishing the attribute segment in response to the request to generate the attribute segment;

formulating one or more rules using one or more of the attribute segments to define one or more policy groups, the one or more policy groups comprising a default policy group, each entity of the plurality of entities corresponding to at least one policy group;

assigning one or more policy parameters of a plurality of policy parameters to each policy group;

assigning a priority to each policy group, a first policy group having a higher priority, a second policy group having a lower priority;

identifying a policy group corresponding to an entity of the plurality of entities in accordance with the one or more rules, the entity comprising one of an item, a location, a channel, or any combination of the preceding, the policy group identified by:

determining that the entity corresponds to the first policy group and to the second policy group; and identifying the first policy group as the identified policy group corresponding to the entity; and selecting the one or more policy parameters for the entity by selecting the one or more policy parameters of the first policy group for the entity.

* * * * *